United States Patent [19]

Awazu

[11] Patent Number: 4,841,454
[45] Date of Patent: Jun. 20, 1989

[54] DISPLAY CONTROLLER WITH A VARIABLE SCROLLING SPEED, AND METHOD FOR OPERATING SAME

[75] Inventor: Koichi Awazu, Tokyo, Japan

[73] Assignee: Kabushiki Kaisha Toshiba, Kawasaki, Japan

[21] Appl. No.: 43,022

[22] Filed: Apr. 27, 1987

[30] Foreign Application Priority Data

Apr. 30, 1986 [JP]  Japan .................................. 61-100753

[51] Int. Cl.$^4$ ............................................. G06F 3/14
[52] U.S. Cl. ..................................... 364/521; 340/724
[58] Field of Search ......... 364/518, 521, 900 MS File; 340/721, 724, 726, 729

[56] References Cited

U.S. PATENT DOCUMENTS

| | | | |
|---|---|---|---|
| 4,228,432 | 10/1980 | Osborne | 364/521 X |
| 4,412,294 | 10/1983 | Watts et al. | 364/521 X |
| 4,648,042 | 3/1987 | Staiger | 364/521 X |
| 4,694,406 | 9/1987 | Shibui et al. | 340/726 |

Primary Examiner—Gary V. Harkcom
Assistant Examiner—H. R. Herndon
Attorney, Agent, or Firm—Cushman, Darby & Cushman

[57] ABSTRACT

The data display-controlling device and method includes a control key used for reducing the speed at which data is displayed on a display unit. If the control key is depressed, this condition is detected by a central processing unit (CPU). Upon detection of the depression of the control key, the CPU reads current time from a timer, and determines whether a predetermined time has passed from the depression of the control key. If the predetermined time has not yet passed, the CPU executes the operating system program, and if the predetermined time has passed, data to be presented is supplied to the display unit.

7 Claims, 2 Drawing Sheets

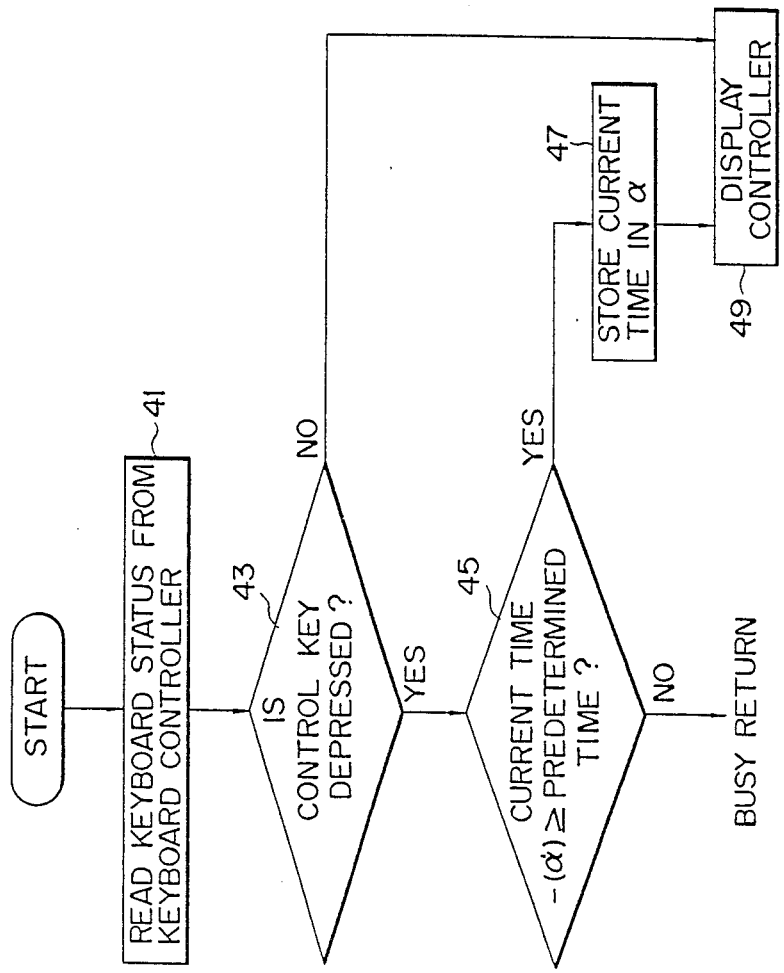

DISPLAY CONTROLLER WITH A VARIABLE SCROLLING SPEED, AND METHOD FOR OPERATING SAME

BACKGROUND OF THE INVENTION

The present invention relates to a data display-controlling device, and more particularly to a data display-controlling device which is used for a data-processing apparatus including a keyboard with a control key, and a display unit for displaying data, and which can vary the speed at which data is displayed on the display unit.

In a conventional data-processing apparatus, data (e.g., a character string) is displayed on the display unit at such a speed that the operator can visually comprehend the data.

With recent developments in microprocessors, the basic clock frequency of the microprocessors has been increased considerably. As a result, the speed at which data is displayed on the display unit has also been increased, resulting in difficulties in comprehending a character string as it is displayed. The comprehension of the character string becomes particularly difficult when a large amount of data is displayed in a scroll mode.

In addition, if the data is scrolled too fast, the operator finds it very difficult to temporarily stop the data at an appropriate line.

SUMMARY OF THE INVENTION

Accordingly, an object of the present invention is to provide a data display-controlling device which solves the above problems and which can switch the display speed between "high" and "low".

A data display-controlling device of the present invention is used for a data-processing apparatus which operates under an operating system program and includes a keyboard for entering data and a display unit for displaying data. To achieve the above object, the data display-controlling device comprises:

instruction means for generating an instruction signal which reduces the speed at which data is displayed on the display unit, by delaying the time at which data to be displayed is supplied to the display unit;

timer means for measuring current time; and data output-controlling means, which operates in response to the instruction signal, for reading the current time measured by the timer means and determining whether a predetermined time has passed on the basis of the read current time, effecting data supply to the display unit if it is determined that the predetermined time has passed, and suspending data supply to the display unit so as to execute the operation system program if it is determined that the predetermined time has not yet passed.

The present invention also comprises a method of carrying out these steps.

According to the data display-controlling device and method of the present invention, the display speed can be changed between "high" and "low" by use of a control key. If the amount of data to be displayed is small (for instance, if the data can be displayed within the display area of the screen at one time), the data is displayed in a high-speed display mode. If the amount of data to be displayed is so large as to exceed the display area of the screen, the data is displayed in a low-speed display mode. If data is displayed in this manner, it can be easily comprehended even in the scroll mode, and the scrolling of data can be stopped at a desirable time. If it is not time to supply the data to be displayed to the display unit, the central processing unit (CPU) immediately executes the operating system program even in the low-speed display mode. The CPU does not remain in the data display routine, waiting for the data-supply time to come. Therefore, the selection of the low-speed display mode does not adversely affect the other processing.

BRIEF DESCRIPTION OF THE PREFERRED EMBODIMENTS

Other objects and features of the present invention will be apparent from the following description taken in connection with the accompanying drawings in which:

FIG. 1 is a block diagram illustrating a data-processing apparatus to which the data display-controlling device according to one embodiment of the present invention is applied; and FIG. 2 shows a flow chart illustrating the processings for reducing the data display speed.

DETAILED DESCRIPTION OF THE PREFERRED EMBODIMENTS

Figure 1:
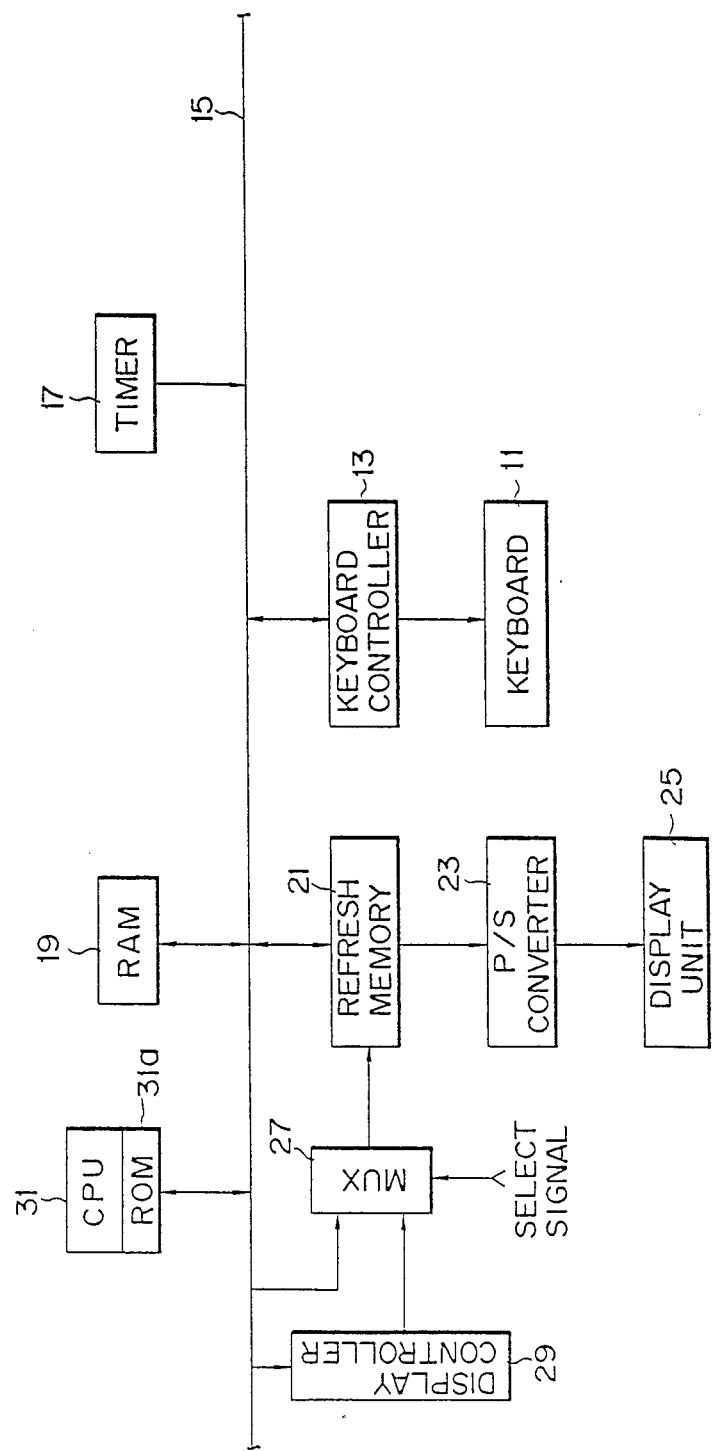

FIG. 1 illustrates a data-processing apparatus to which a data display-controlling device of one embodiment of the present invention is applied. As illustrated, the data-processing apparatus comprises: keyboard 11, which is connected to common bus 15 via keyboard controller 13; timer 17 for measuring current time, random access memory (RAM) 19 for storing the current time measured by timer 17, data to be displayed, and an operating system program; refresh memory 21 for storing data to be displayed; parallel-serial converter 23 for performing parallel-serial conversion of the data supplied from refresh memory 21; and display unit 25 for displaying the data supplied from parallel-serial converter 23. Multiplexer 27 has an output terminal connected to refresh memory 27, and two input terminals connected to common bus line 15 and display controller 29, respectively. Either display control information from CPU 31 or that from display controller 29 is selected by multiplexer 27 on the basis of a selection signal supplied from CPU 31, and the selected display control information is supplied to refresh memory 21. Display controller 29 can be formed, for example, by HD 46505, which is commercially available from Hitachi Ltd., Japan. Display controller 29, multiplexer 27, refresh memory 21, keyboard controller 13, timer 17, and RAM 19 (which are all directly connected to common bus 15) operate under the control of CPU 31. CPU 31 includes ROM 31a, which stores the display control program shown in FIG. 2. CPU 31 can be formed, for example, by Intel 80286, which is commercially available from U.S. Intel Corporation. Display unit 25 may be of a plasma type, a liquid crystal type, or a CRT type. Keyboard 11 includes a control key for commanding the reduction of the data display speed.

The processing performed in the above embodiment will be described with reference to the flow chart shown in FIG. 2. In Step 41, CPU 31 reads keyboard status information from keyboard controller 13. In step 43, it is determined, on the basis of the keyboard status information, whether or not the control key is depressed. If it is determined that the control key is not depressed, the flow advances to step 49, in which the control of the data display is given over to display controller 29. If it is determined that the control key is depressed, the flow advances to step 45. In this step, CPU 31 reads the current time which is then measured by timer 17 and the current time which is stored in RAM 19, and subtracts the value of the latter from that of the former. Further, CPU 31 compares the difference of the subtraction with a predetermined value (e.g., 50 msec). This comparison is made so as to determine whether the control key has been depressed for more than 50 msec. When these steps are effected for the first time, an initial value of "0" is stored in RAM 19, so that the difference of the subtraction is not larger than 50 msec. Therefore, CPU 31 exits from the display control routine and executes the operating system program. After effecting other processing (e.g., the processing for entering data from keyboard 11) for a certain length of time, the flow is returned to the display control routine shown in FIG. 2. This procedure is repeated until it is determined that the control key has been depressed for more than 50 msec and the data to be displayed is supplied to display unit 25. If it is determined in step 45 that the difference of the subtraction exceeds 50 msec, step 47 is effected, in which data on the current time read from timer 17 is stored in a predetermined area of RAM 19. Next, step 49 is effected, in which the data to be displayed is supplied to display controller 29. Therefore, the data to be displayed is supplied to display unit 25 with a time delay of 50 msec. In other words, one character is displayed at least 50 msec after the preceding character is displayed. As a result, the data display speed is reduced, enabling the operator to easily comprehend the data on the display unit. When the data is being scrolled in this fashion, it may happen that the operator wants to stop the scrolling of the data. In such a case, the operator depresses a certain key (i.e., "S" key) while simultaneously pressing the control key. By so doing, the scrolling of the data is stopped. Since the data can be scrolled slowly, the operator can easily stop the scroll display at any line he wants.

The present invention is not limited to the above embodiment. In the above embodiment, the time period during which the control key is depressed is 50 msec, but this time length can be determined arbitrarily. In addition, the data display-controlling device can be applied also to a data-processing apparatus which can display data in a scroll mode, such as a personal computer, a word processor, and a work station.

What is claimed is:

1. A data display-controlling device for use with a data processing apparatus, which includes a keyboard for entering data and a display unit for displaying the data, and which controls said keyboard unit and said display unit by executing an operating system program, said data display-controlling device comprising:
   scroll display controller means for displaying display data on said display unit in a scrolling manner;
   designating means, coupled to said display controller means, for designating said scroll display controller means to scroll-display the display data on said display unit at one of a high speed and a low speed;
   timer means for measuring a current time; and
   control means for outputting display data to said display unit, in response to said designating means designating the scroll-display at low speed, by: (1) determining, based on the current time from said timer means, whether a predetermined time has elapsed since a last output of display data, (2) executing the operating system program until the predetermined time elapses, and (3) outputting display data to said display unit when said predetermined time has elapsed.

2. A data display-controlling device according to claim 1, wherein the data output-controlling means reads the current time measured by the timer means and stores the read current time in its own memory when it is determined that the predetermined time has not yet passed, and, after execution of the operating system program for a predetermined time, the data output-controlling means determines once again whether the data to be displayed should be supplied to the display unit, by subtracting the current time stored in the memory from the current time newly read from the timer means and comparing the result of the subtraction with a predetermined value.

3. A data display-controlling device according to claim 1, wherein the instruction means is a control key provided for the keyboard.

4. A data display-controlling device according to claim 3, wherein the keyboard includes a scroll display-stopping key, which is used in combination with the control key and wherein said control means includes means for recognizing a combination of said control key and said scroll display stopping key so as to stop the data display at a desirable line.

5. A data display-controlling device according to claim 1, wherein the predetermined time can be arbitrarily determined.

6. A data display-controlling device according to claim 1, further comprising storage means, and wherein said control means also includes means for: (4) reading a current time measured by said timer means at each output of display data (5) storing the read time in said storage means, and (6) after execution of the operating system program for a predetermined time, determining whether the data to be displayed should be supplied to said display unit by subtracting the read time stored in said storage means from a current time newly read from said timer means and comparing the result of the subtraction with a predetermined value.

7. A method of controlling a data display-controlling device used with a data processing apparatus, which includes a keyboard for entering data and a display unit for displaying the data, and which controls said keyboard unit and said display unit by executing an operating system program, said method comprising the steps of:
   designating one of a high speed and low speed at which to display the display data;
   displaying display data on said display unit in a scrolling manner when said high speed is designated;
   and when the low speed is designated:
   (a) measuring a reference time at a time of output of display data,
   (b) measuring a current time,
   (c) determining, based on the current time, whether a predetermined time has elapsed since the reference time,
   (d) executing the operating system program until the predetermined time elapses, and
   (e) outputting display data to said display unit when said predetermined time has elapsed.

* * * * *